United States Patent [19]
Blake et al.

[11] 3,767,259
[45] Oct. 23, 1973

[54] CHILD'S VEHICLE SAFETY SEAT ASSEMBLY

[76] Inventors: Pressley L. Blake, 809 Bell Ave.; Josiah D. Johnson, 1202 Strong Ave., both of Greenwood, Miss. 38930

[22] Filed: Oct. 7, 1971

[21] Appl. No.: 187,439

[52] U.S. Cl.................. 297/250, 297/216, 297/390
[51] Int. Cl............................................... A47d 1/10
[58] Field of Search.................. 297/250, 216, 254, 297/253, 256, 390, 463, 307; 248/374, 375

[56] References Cited
UNITED STATES PATENTS

| | | | |
|---|---|---|---|
| 2,664,140 | 12/1953 | Kindelberger | 297/250 X |
| 3,054,637 | 9/1962 | Pambello | 297/256 X |
| 2,051,043 | 8/1936 | Herold | 248/374 |
| 3,563,601 | 2/1971 | Dickey | 297/254 X |
| 3,620,568 | 11/1971 | Morrow | 297/307 |
| 3,531,158 | 9/1970 | Allen | 297/463 X |
| 2,606,592 | 8/1952 | McIntyre | 248/374 |
| 3,111,342 | 11/1963 | DeVos | 297/216 |

FOREIGN PATENTS OR APPLICATIONS

| | | | |
|---|---|---|---|
| 620,512 | 5/1961 | Canada | 297/254 |

*Primary Examiner*—Francis K. Zugel
*Attorney*—Harvey B. Jacobson

[57] ABSTRACT

A safety seat assembly comprising a rigid support bracket adapted to rest upon a vehicle seat with means for fastening to the vehicle seat belt to prevent forward movement, and a cushioned chair with with a safety harness including underarm and side supports, said chair being connected to the support bracket by way of a cylindrical rubber mount extending horizontally across the center of the chair back and shock absorber assemblies interconnecting the chair back with the support bracket at points above and below the rubber mount.

13 Claims, 5 Drawing Figures

PATENTED OCT 23 1973

PATENTED OCT 23 1973 3,767,259
SHEET 2 OF 2
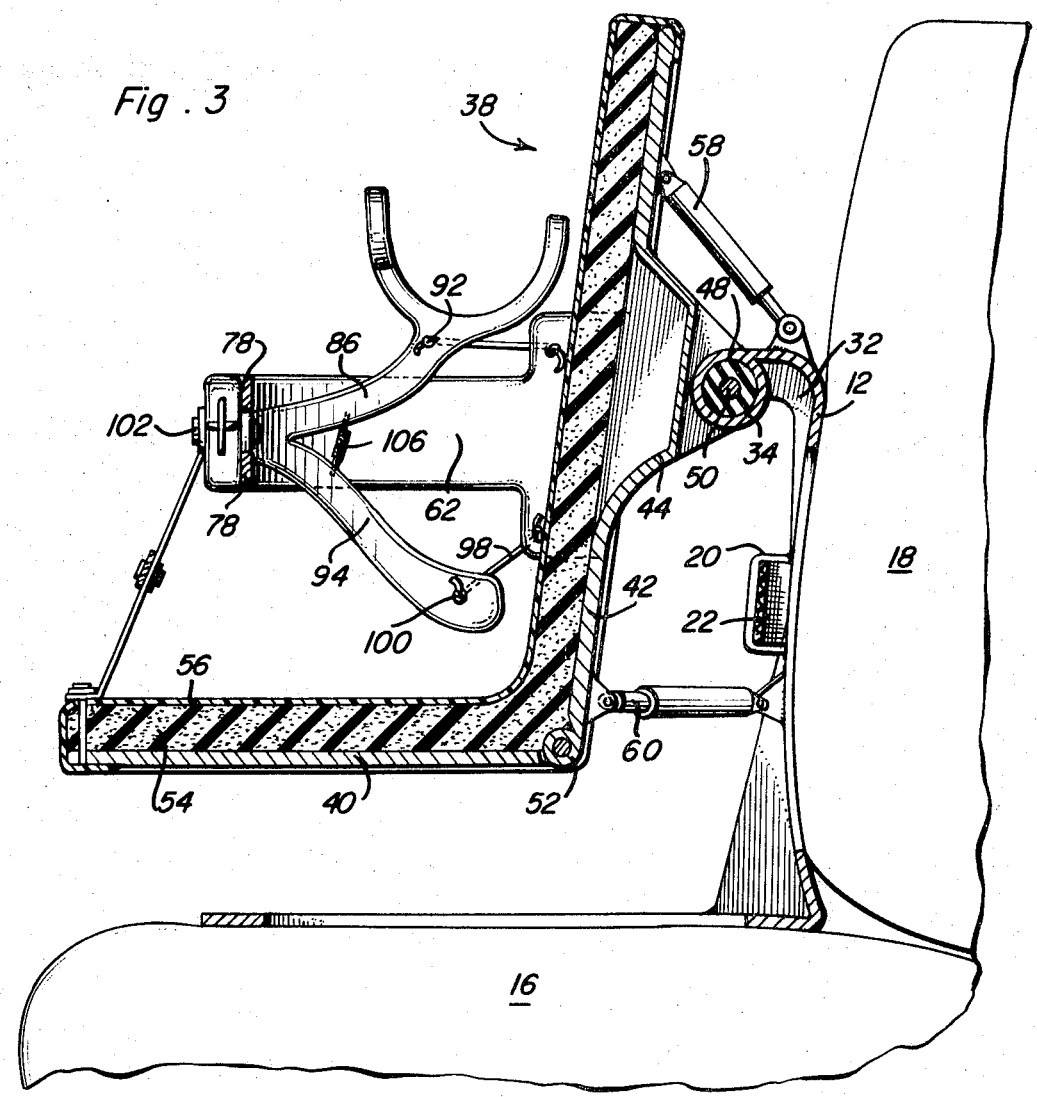
Fig. 3
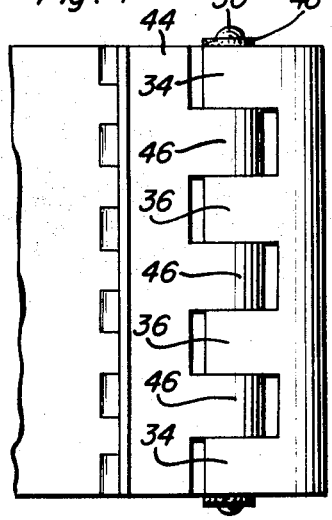
Fig. 4
Fig. 5

CHILD'S VEHICLE SAFETY SEAT ASSEMBLY

The present invention is generally related to seats, and more particularly, to safety seats for use with motor vehicles and the like.

In the past, a variety of vehicle safety seats for children have been available. Many such constructions were adapted to fasten to the vehicle seat to hold the child in place during movement of the vehicle. However, these conventional constructions, for the most part, were not provided with adequate safety equipment to protect the child in the event of a rapid stop or accident. It has been found that children are more susceptible to accidental injury than older individuals under the same circumstances, one reason being that standard vehicle seats are not designed to fit and properly accommodate small children. Standard seat belts have been found to ineffective in many cases since children easily release themselves or slip free from the belt in the event of an accident. If such vehicle injuries are to be avoided, more comprehensive safety measures must be provided by which the child is held firmly in place and cushioned against forces due to rapid changes in speed such as caused by an accident.

It is an object of the present invention to provide a novel vehicle seat assembly which includes means for supporting a child in a cushioned manner such that in the event of an accident or rapid change in speed, the forces acting upon his body are greatly diminished, thereby reducing the risk of injury.

Another object of the present invention is to provide a versatile vehicle safety seat for children which includes a cushioned chair which is connected to a support bracket by way of a pivotal rubber mount and several shock absorber assemblies such that the entire chair is permitted to pivot in a manner which significantly reduces the forces upon the child's body due to rapid changes in speed and the like.

It is a further object of the present invention to provide a unique child's safety seat including a safety harness having underarm supports, torso restraints and a restraining belt coupled to a crotch strap such that the child is held firmly in the seat in a supported manner, thereby minimizing the changes of injury in the event of an accident or the like.

Still another object of the present invention is to provide a novel child's safety seat assembly for use with vehicles and the like and which is extremely durable, long-lasting and able to restrain movement of the child therefrom under adverse conditions, yet, is relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a sectional view taken along section 3—3 of FIG. 2.

FIG. 4 is a partial plan view illustrating the rubber mount hinge connection associated with the present invention.

FIG. 5 is a partial sectional view of the connection between the chair back and the restraining belt associated with the present invention.

Figure 1:
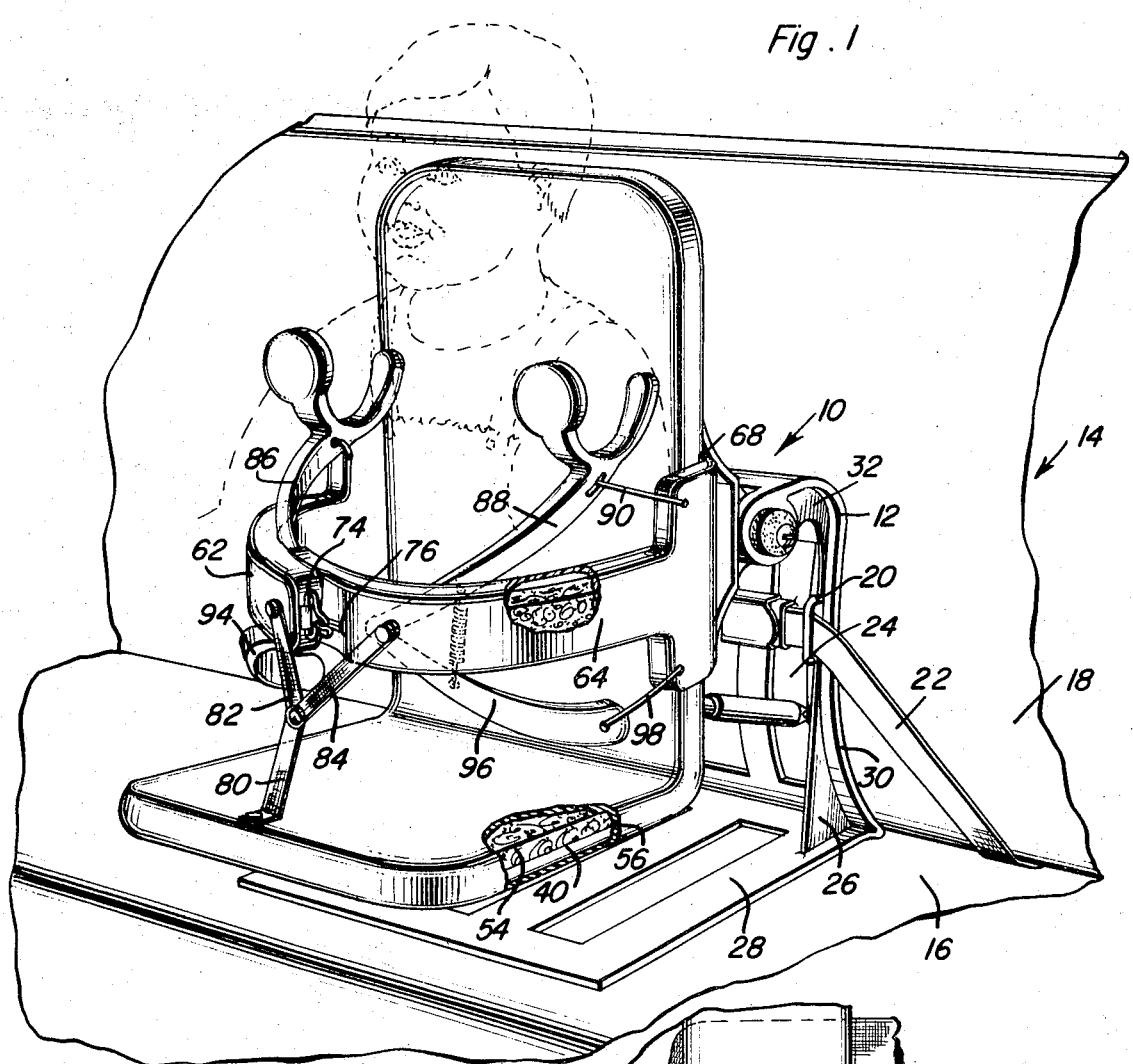
FIG. 1 is a perspective view of the safety seat assembly of the present invention mounted to a typical vehicle seat by way of a standard seat belt.
Figure 2:
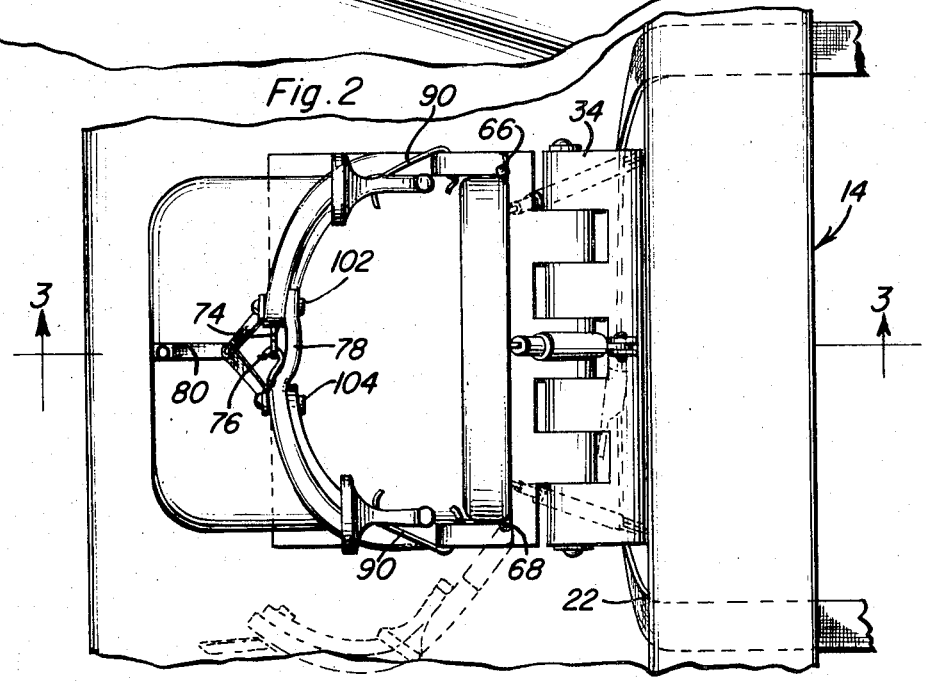
FIG. 2 is a plan view of the safety seat assembly illustrated in FIG. 1.

Referring now, more particularly, to FIGS. 1 through 3, the safety seat assembly of the present invention is generally indicated by the numeral 10 and includes a support bracket 12 adapted to rest upon a conventional vehicle seat generally indicated by the numeral 14 and including bottom and back portions 16 and 18, respectively. Support bracket 12 is provided with a pair of oppositely disposed, U-shaped fastening members 20 adapted to receive a conventional standard seat belt indicated by the numeral 22. Of course, other means of fastening the support bracket to the seat belt may be provided. For example, the seat belt ends may be wrapped around the side portion of the support bracket passing through the elongated openings at 24. Preferably, the support bracket is made of light-weight material such as aluminum and is provided with a plurality of elongated lightening holes such as that indicated at 24. A pair of gusset plates 26 may be provided for reinforcement between the bottom and back portions 28 and 30 of the support bracket.

The top of back portion 30 may be provided with a pair of reinforcing webs 32 which extend upwardly and outwardly and terminate at a pair of spaced cylindrical mounting flanges 34. A second pair of cylindrical mounting flanges 36 are equally spaced from each other and from flanges 34 to define a half hinge associated with the support bracket.

A support chair generally indicated by the numeral 38 is provided with a rigid framework comprising bottom and back portions 40 and 42, respectively. Back portion 42 is provided with a centrally located, horizontally extending mounting bracket 44 including a plurality of equally spaced cylindrical flanges 46 defining a half hinge which meshes with that associated with support bracket 12, to provide a chair mounting hinge. An elongated cylindrical rubber mounting 48 extends through each of the cylindrical flanges in snug engagement therewith and may be strengthened by reinforcing rod 50, extending axially therethrough.

Preferably, the chair framework portions 40 and 42 are coupled together by way of a folding hinge 52 to permit easy collapse of the chair to a compact condition for convenient storage and the like. The chair framework is covered with a layer of resilient material 54 of polyurethane or the like to provide a comfortable seating surface. The chair is also provided with an outer layer of synthetic material 56 such as vinyl to provide a durable, long-wearing surface. The polyurethane layer provides an energy absorbing construction which prevents injury in the case of impact.

The back portion 42 of the chair framework is provided with an upper shock absorber assembly 58 connected to support bracket 12. Preferably, the shock absorber assembly is springloaded in such a manner as to influence the chair in a clockwise direction as it is shown in FIG. 3. Thus, upon impact of the front end of the vehicle, or upon rapid deceleration, the chair will tend to pivot in a counterclockwise direction about its mounting hinge. This counterclockwise movement is cushioned or restrained by way of the shock absorber assembly 58, such that the chair is mounted in a cushioned manner and the forces due to an impact or the like are not fully transmitted to a child seated in the chair. If desired, the upper shock absorber assembly 58 may be provided with a dashpot structure, such as that used with vehicle shock absorbers, to further attenuate forward movement of the chair. Preferably, the safety chair is also provided with a pair of lower shock absorber assemblies 60 which act in a manner opposite to shock absorber assembly 58, the combined effect of all of the shock absorber assemblies being to cushion the chair against abrupt movements and to return it to a stable position. Thus, both clockwise and counterclockwise movements of the safety chair relative to its support bracket are damped or attenuated in a manner which significantly reduces the risk of injury to a child properly seated in the chair.

In order to prevent injury to a child seated in the safety chair, it is essential that his movement therefrom be properly restrained. This is achieved by way of a safety harness including a safety belt comprised of a pair of oppositely disposed belt sections 62 and 64 connected to the side edges of the chair framework 42 by way of hinge connections 66 and 68, respectively. Of course, other conventional pivotal fastening means may also be utilized, if desired. Each half belt is of a rigid, yet, somewhat flexible construction such that it will give or flex upon impact. Preferably, each belt half is provided with a layer of foam, energy-absorbing material such as polyurethane as indicated at 68 with a covering 70 of vinyl or similar material. Additional rigidity and strength may be provided by a flexible strip 72 of aluminum or similar material connected to hinges 66 and 68.

The purpose of hinges 66 and 68 is to permit pivotal movement of the belt halves 62 and 64 to aid in seating a child in the safety chair. The ends of the belt halves are provided with male and female buckle members 74 and 76 which are adapted to conveniently engage each other in a locking manner as with conventional seat belt constructions. The end portion of belt half 64 is provided with an extension 78 of reduced thickness which is effective to cover buckle members 74 and 76 to avoid contact therewith in the event of a rapid deceleration or the like.

The chair is further provided with a crotch strap including a lower section 80 fastened to the chair bottom by conventional means and a pair of diverging upper sections 82 and 84 connected to belt havles 62 and 64, respectively. Preferably, the junction between sections 82 and 84 is provided with a snap fastener or similar readily releasable fastening means to permit convenient positioning of the child in the safety chair. The safety chair is further provided with a pair of oppositely disposed, upwardly extending arms 86 and 88 adapted to support a child by way of his underarm regions. Each arm is of a relatively rigid, yet somewhat flexible construction including a body of polyurethane with a vinyl covering. If desired, the shape of each arm may be reinforced by way of internal reinforcing members of metal construction such as a heavy gauge wire not shown. The lower end of each arm is pivotally connected to a corresponding one of the belt halves to permit pivotal movement within predetermined limits to adjust the arms relative to the child. The upper portion of each arm is provided with a curved cradle which opens upwardly and is adapted to engage the underarm regions of the child. Flexible restraints 90 are connected to each arm at the base of its cradle, with the opposite ends connected to the restraining belts adjacent to hinges 66 and 68, such that forward movement of arms 86 and 88 is restrained. Preferably, each flexible restraint 90 is made of heavy cord, such as nylon, chain, cable or the like.

By adjusting the length of each flexible restraint, the curved cradles engaging the child's underarm regions are effective to prevent forward movement of the child in the event of an accident or rapid deceleration. The importance of this feature cannot be over-emphasized. With conventional child safety seats, adequate means were not provided to prevent forward movement of the upper portions of a child's body under the conditions of an accident or rapid deceleration. It will be appreciated that while arms 86 and 88 restrain forward movement of the child beyond predetermined limits, they permit a significant degree of mobility to the child under normal driving conditions. Pivotal movement of the arms permits the child to rest in a normal seated position with his back engaging the safety chair back portion. Preferably, each flexible restraint extends through the associated arm and belt half with knots or similar fastening provided at its opposite ends. The length of each flexible restraint may be adjusted by taking up or letting out slack through one of the end knots, one such knot being indicated at 92.

The safety harness is further provided with a pair of opposite elongated torso restraints 94 and 96 which, preferably, are integral with underarm supports 86 and 88. Each torso restraint extends below the restraining belt and curves backwardly and around the sides of the safety chair along a path similar to the curves of the belt halves 62 and 64. The ends of the torso restraints are connected to the hinged areas of the belt halves by way of second flexible restraints 98 similar to flexible restraints 90. The flexible restraints may be connected by way of knots, such as that indicated at 100 in a manner similar to the connections to underarm supports 86 and 88. The torso restraints and underarm supports are pivotally connected to the belt halves by way of pins 102 and 104. In addition, coil springs 106 and 108 may be provided between the restraints and supports to bias them toward each other and have a stiffening effect on the resilient material. The torso restraints are effective to prevent abnormal transverse or forward movements of the torso region of the child from the safety seat. Such is effective to prevent the child from sliding beneath the restraining belt and being dislodged from the chair.

From the foregoing description, it will be appreciated that the safety harness associated with the present invention is effective to prevent abnormal movements of the child within the safety chair and to prevent the child from being displaced therefrom in the event of an accident. It will also be appreciated that the versatile mounting of the safety chair to support bracket 12 significantly attenuates any significant shocks or impacts which the vehicle may endure. The shock absorber assemblies are effective to prevent abnormal rotational movement of the safety chair, while the cylindrical rubber mount is effective to reduce vibrations transmitted to the chair. The combination of the unique features of the safety harness and chair mounting are effective to significantly reduce the risk of injury to the child in the event of an accident or similar abnormal conditions. Minor changes in the shape, materials, or exact positions of the underarm supports, torso restraints, or associated restraining belt are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A safety seat assembly for mounting to a vehicle seat, said assembly comprising a support bracket adapted to rest on a vehicle seat and including means for fastening to a vehicle seat belt, said support bracket further including a first substantially horizontal elongated flange means, a safety chair including a rigid framework with a second substantially horizontal elongated flange means pivotally connecting the chair to said first flange means for pivotal movement of the chair relative to said support bracket, said first and second flange means defining a mounting hinge with an axial opening extending therethrough, and a resilient mounting member being located in said axial opening in operative engagement with said first and second flange means which pivot about said resilient mounting member, said assembly including shock absorbing means extending between said chair framework and said support bracket for absorbing forces imparted to the support bracket and significantly restraining pivotal movement of said safety chair about said resilient mounting members.

2. The structure set forth in claim 1 wherein said axial opening and said resilient mounting member are cylindrical in shape, said resilient mounting member slidably engaging areas of said first and second flange means defining said axial opening.

3. The structure set forth in claim 2 wherein said assembly includes a rigid reinforcing rod extending axially through the length of said resilient mounting member.

4. A safety seat assembly for mounting to a vehicle seat, said assembly comprising a support bracket adapted to rest on a vehicle seat and including means for fastening to a vehicle seat belt, said support bracket further including a first substantially horizontal elongated flange means, stationary with respect to said support bracket, a safety chair including a rigid framework with a second substantially horizontal elongated flange means pivotally connecting the chair to said first flange means for pivotal movement of the chair relative to said support bracket, said safety chair including an upwardly extending back portion, said first and second flange meas defining a substantially horizontal mounting hinge located adjacent said back portion, first shock absorbing means extending between said safety chair framework above said hinge and said support bracket for permitting restrained pivotal movement of said safety chair.

5. A safety seat assembly for mounting to a vehicle seat, said assembly comprising a support bracket adapted to rest on a vehicle seat and including means for fastening to a vehicle seat belt, said support bracket further including a first substantially horizontal elongated flange means, stationary with respect to said support bracket, a safety chair including a rigid framework with a second substantially horizontal elongated flange means pivotally connecting the chair to said first flange means for pivotal movement of the chair relative to said support bracket, said safety chair including an upwardly extending back portion, said first and second flange means defining a substantially horizontal mounting hinge located adjacent said back portion, first shock absorbing means extending between said safety chair framework above said hinge and said support bracket for permitting restrained pivotal movement of said safety chair.

6. The structure set forth in claim 5 wherein said first shock absorbing means includes first biasing means for normally maintaining said safety chair in a normal sitting position.

7. The structure set forth in claim 5 wherein said assembly includes second shock absorbing means extending between said chair framework below said mounting hinge and said support bracket, said second shock absorbing means including second biasing means for influencing said safety chair toward the normal sitting position.

8. A safety seat assembly comprising a safety chair framework defining bottom and back chair portions, said back portion having a pair of opposite sides, and a safety harness assembly connected to said opposite sides including a restraining belt of impact absorbing material adapted to extend around the waist regions of a child occupying said chair and underarm support means for engaging the underarm regions of a child in the safety chair to restrain his forward movement beyond predetermined bounds, said underarm support means including a pair of oppositely disposed, relatively rigid arms connected to said restraining belt and extending thereabove.

9. The structure set forth in claim 8 wherein each of said arms includes an upper curved cradle portion adapted to engage the underarm regions of a child in the safety chair.

10. The structure set forth in claim 9 wherein said harness assembly includes a pair of oppositely disposed torso restraining members extending below said restraining belt and adapted to restrain transverse and forward movement of a child seated in the safety chair.

11. The structure set forth in claim 10 wherein said arms are pivotally mounted to said restraining belt, and flexible restraining members connected to said arms remote from their pivotal mountings and extending in a backward direction toward the chair back to restrain forward movement of said arms beyond predetermined limits.

12. The structure set forth in claim 11 wherein said torso restraining members are integral with said arms and are provided with flexible restraining elements extending from their end portions in a backward direction toward the chair back to prevent forward movement of the torso restraining members beyond predetermined limits.

13. The structure set forth in claim 8 wherein said harness assembly includes a pair of oppositely disposed torso restraining members extending below said restraining belt and adapted to restrain transverse and forward movement of a child seated in the safety chair.

14. The structure set forth in claim 9 wherein said arms are pivotally mounted to said restraining belt, and flexible restraining members connected to said arms remote from their pivotal mountings and extending in a backward direction toward the chair back to restrain forward movement of said arms beyond predetermined limits.

* * * * *